(12) United States Patent
Gold et al.

(10) Patent No.: US 7,818,530 B2
(45) Date of Patent: Oct. 19, 2010

(54) DATA MANAGEMENT SYSTEMS, ARTICLES OF MANUFACTURE, AND DATA STORAGE METHODS

(75) Inventors: Stephen Gold, Ft. Collins, CO (US); Harald Burose, Herrenberg (DE); Sebastien Schikora, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1526 days.

(21) Appl. No.: 10/723,950

(22) Filed: Nov. 26, 2003

(65) Prior Publication Data

US 2005/0132257 A1  Jun. 16, 2005

(51) Int. Cl.
*G06F 13/00* (2006.01)

(52) U.S. Cl. ............... 711/170; 711/204; 707/634; 714/6; 714/47

(58) Field of Classification Search .............. 711/162, 711/163, 170, 171; 707/204; 714/6, 47
See application file for complete search history.

(56) References Cited

U.S. PATENT DOCUMENTS

| | | | |
|---|---|---|---|
| 5,479,654 A | 12/1995 | Squibb | |
| 5,720,025 A * | 2/1998 | Wilkes et al. | 714/6 |
| 5,870,765 A | 2/1999 | Bauer et al. | |
| 6,058,494 A | 5/2000 | Gold et al. | |
| 6,145,089 A * | 11/2000 | Le et al. | 714/4 |
| 6,233,589 B1 | 5/2001 | Balcha et al. | |
| 6,263,454 B1 | 7/2001 | Gold et al. | |
| 6,366,987 B1 | 4/2002 | Tzelnic et al. | |
| 6,442,706 B1 * | 8/2002 | Wahl et al. | 714/6 |
| 6,532,588 B1 | 3/2003 | Porter | |
| 6,542,906 B2 | 4/2003 | Korn | |
| 6,549,992 B1 | 4/2003 | Armangau et al. | |
| 6,714,952 B2 | 3/2004 | Dunham et al. | |
| 6,934,722 B1 | 8/2005 | Goshey et al. | |
| 6,934,877 B2 | 8/2005 | Tamatsu | |
| 7,020,665 B2 | 3/2006 | Douceur et al. | |
| 7,039,778 B2 | 5/2006 | Yamasaki | |
| 7,100,005 B2 | 8/2006 | Pearl | |
| 7,257,649 B2 * | 8/2007 | Rabbers et al. | 709/248 |
| 7,349,929 B2 | 3/2008 | Pfitznor | |
| 2002/0040405 A1 | 4/2002 | Gold | |
| 2002/0042892 A1 | 4/2002 | Gold | |
| 2002/0073106 A1 | 6/2002 | Parker et al. | |
| 2002/0129128 A1 * | 9/2002 | Gold et al. | 709/220 |
| 2002/0147733 A1 | 10/2002 | Gold et al. | |
| 2002/0147784 A1 * | 10/2002 | Gold et al. | 709/208 |
| 2002/0174139 A1 | 11/2002 | Midgley et al. | |
| 2003/0115472 A1 * | 6/2003 | Chang | 713/182 |
| 2003/0159136 A1 | 8/2003 | Huang et al. | |
| 2004/0012812 A1 * | 1/2004 | Shimizu | 358/1.15 |
| 2004/0078602 A1 | 4/2004 | Rothbarth et al. | |
| 2004/0123271 A1 | 6/2004 | Bindewald et al. | |
| 2005/0015663 A1 | 1/2005 | Armangau et al. | |
| 2005/0071390 A1 * | 3/2005 | Midgley et al. | 707/204 |
| 2005/0114408 A1 | 5/2005 | Gold et al. | |
| 2005/0193080 A1 * | 9/2005 | Gold et al. | 709/208 |

* cited by examiner

*Primary Examiner*—Reba I Elmore

(57) ABSTRACT

Data management systems, articles of manufacture, and data storage methods are described. According to one aspect, a data management system provides a data storage system configured to store data of a plurality of client protected computer systems, wherein the data storage system comprises a plurality of storage devices individually having a respective capacity, and a quantity of the data of the protected computer systems to be stored exceeds capacities of individual ones of the storage devices and storage control circuitry coupled with the data storage system and configured to assign individual ones of the individual storage devices to store data for respective ones of the protected computer systems.

47 Claims, 3 Drawing Sheets

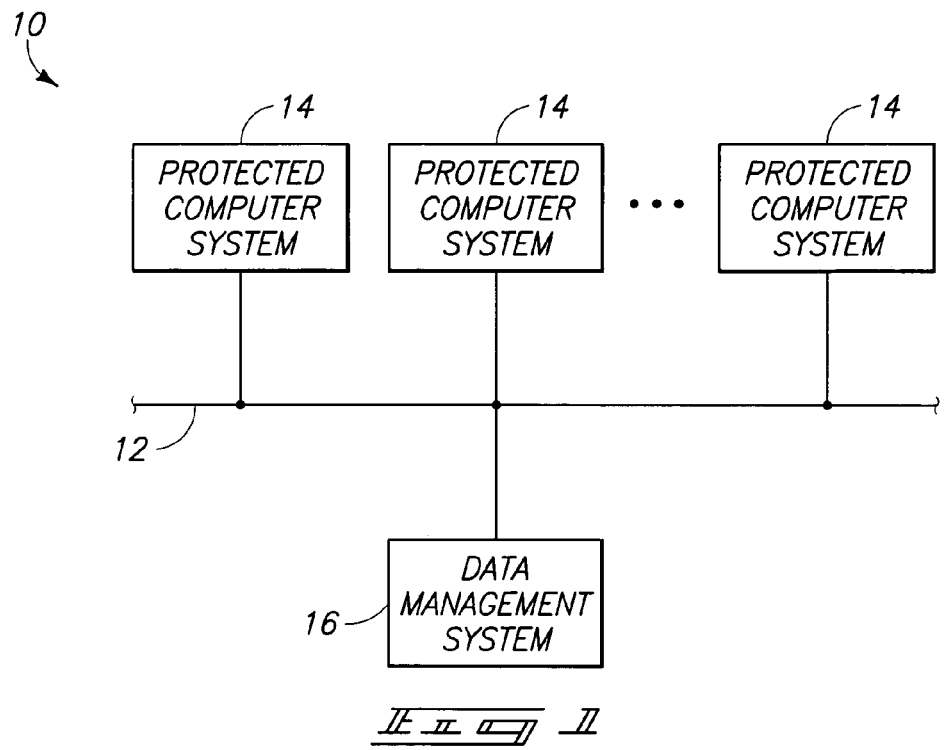
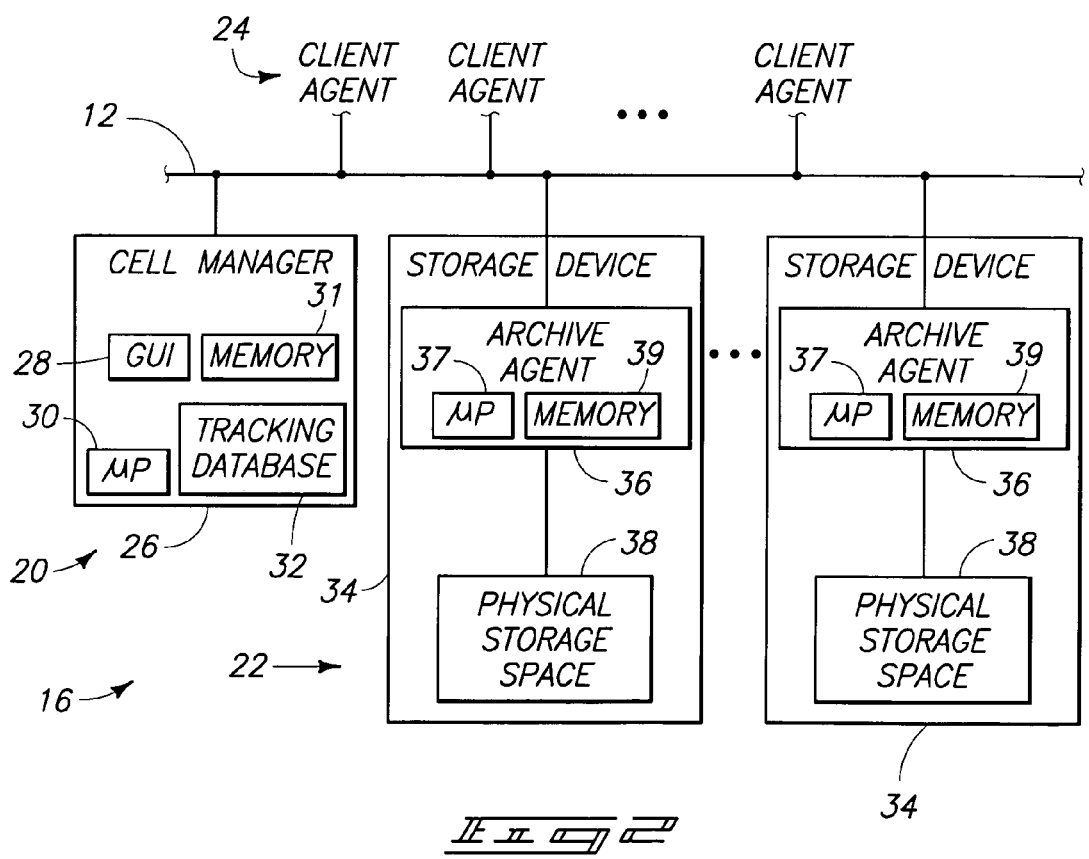

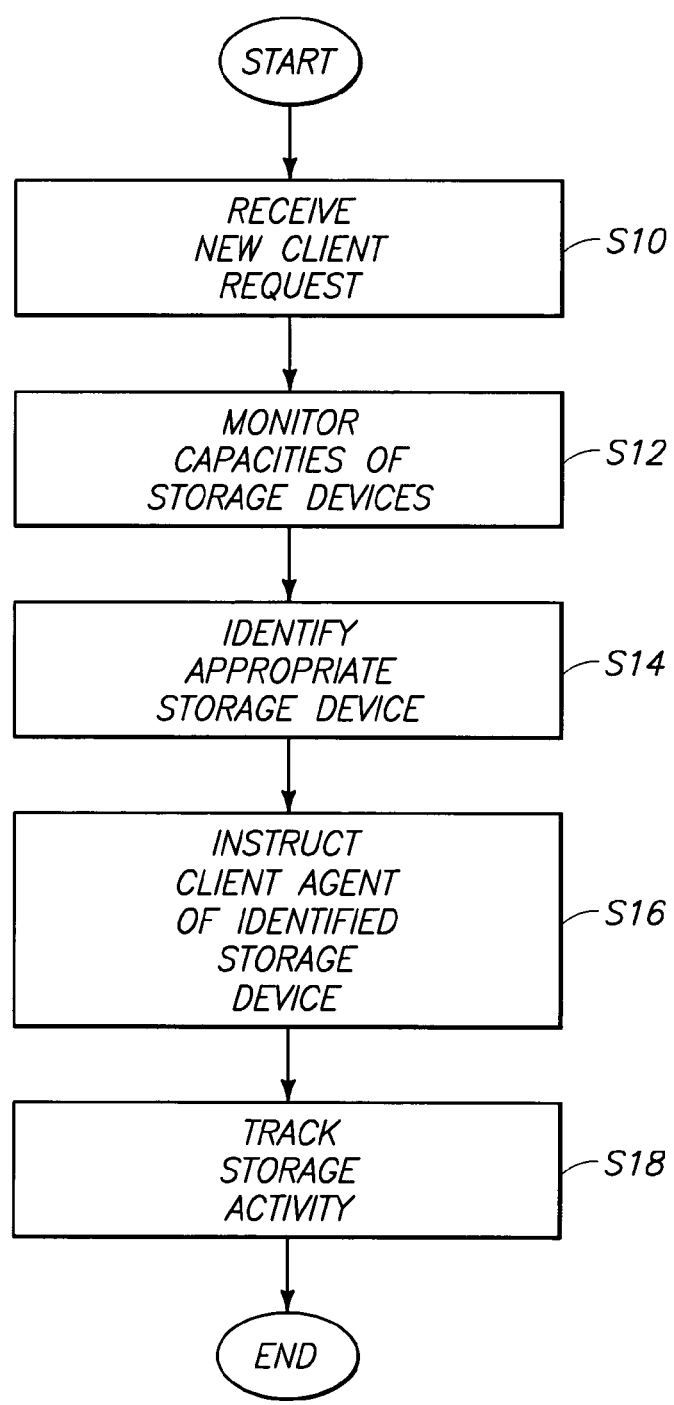

DATA MANAGEMENT SYSTEMS, ARTICLES OF MANUFACTURE, AND DATA STORAGE METHODS

CROSS REFERENCE TO RELATED APPLICATIONS

This application is related to copending U.S. patent application entitled "Data Management Systems, Data Management System Storage Devices, Articles Of Manufacture, And Data Management Methods", listing Stephen Gold and Harald Burose as inventors, having U.S. patent application Ser. No. 10/723,949, which was filed concurrently on Nov. 26, 2003 and which is incorporated by reference herein.

FIELD OF THE INVENTION

At least some aspects of the invention relate to data management systems, articles of manufacture, and data storage methods.

BACKGROUND OF THE INVENTION

Reliable data protection solutions are becoming increasingly important as the usage of and reliance upon electronic data continue to increase. For example, data of numerous business processes may be entirely or substantially electronically stored. Exemplary processes including accounting systems, administrative (e.g., docketing, calendaring, record-keeping, etc.) systems, email systems, etc. may generate significant amounts of electronic data. It is important to protect against loss of the generated electronic data.

Accordingly, high capacity data protection storage devices are becoming commonplace in numerous implementations, such as libraries, and backup and archive configurations, for example. It is desired for these arrangements to provide storage capabilities with minimal interrupts of the host system being protected. Increased speed, accessibility and reliability are additionally desired for providing short or long-term storage of digital data.

Some conventional arrangements utilize tape based systems to provide data protection solutions. First generation configurations deliver up to 100 GB of native data capacity on a single cartridge, while subsequent generations provide single-cartridge native data storage capacities of 1.6 TB, or more. Tape systems provide benefits of relatively simplistic design and reduced cost, but suffer from drawbacks of having relatively inflexible designs, and relatively slow speeds.

Other data protection solutions utilize disks for mass storage. Some disk storage systems provide increased flexibility with respect to configurability as well as provide increased operational speeds. Software may be provided in some disk archive designs to provide management of data storage within the disks. However, these disk archive management systems are not scalable. As the storage capacity of the disks is consumed during usage, it may be desired to add additional disks to accommodate additional storage requirements. However, at a certain point, the management system may be unable to effectively manage data storage operations due to the increased size and/or number of the disks being managed and/or the amount of data being stored. For example, existing resource limitations, in addition to physical storage space, include limitations of central processing units, memory, and/or input/output handling. These limitations impact the amount of data capable of being effectively stored or managed.

When maximum capacity is reached for a given system, it may be necessary for a software stack of a backup controller managing the system (e.g., controlling when backups are performed and where the data is stored) to stop backups, or move all stored data to another system wherein tracking data is updated for the data. These operations may result in a large amount of traffic between the plural systems and greatly degrade disk archive performance.

Accordingly, new apparatus and methods are desired to provide improved data protection solutions.

DESCRIPTION OF THE DRAWINGS

FIG. 1 is a functional block diagram of an exemplary computer network according to one embodiment.

FIG. 2 is a functional block diagram of an exemplary data management system according to one embodiment.

FIG. 3 is a flow chart of an exemplary methodology executable by the data management system according to one embodiment.

DETAILED DESCRIPTION OF THE INVENTION

Figure 4:
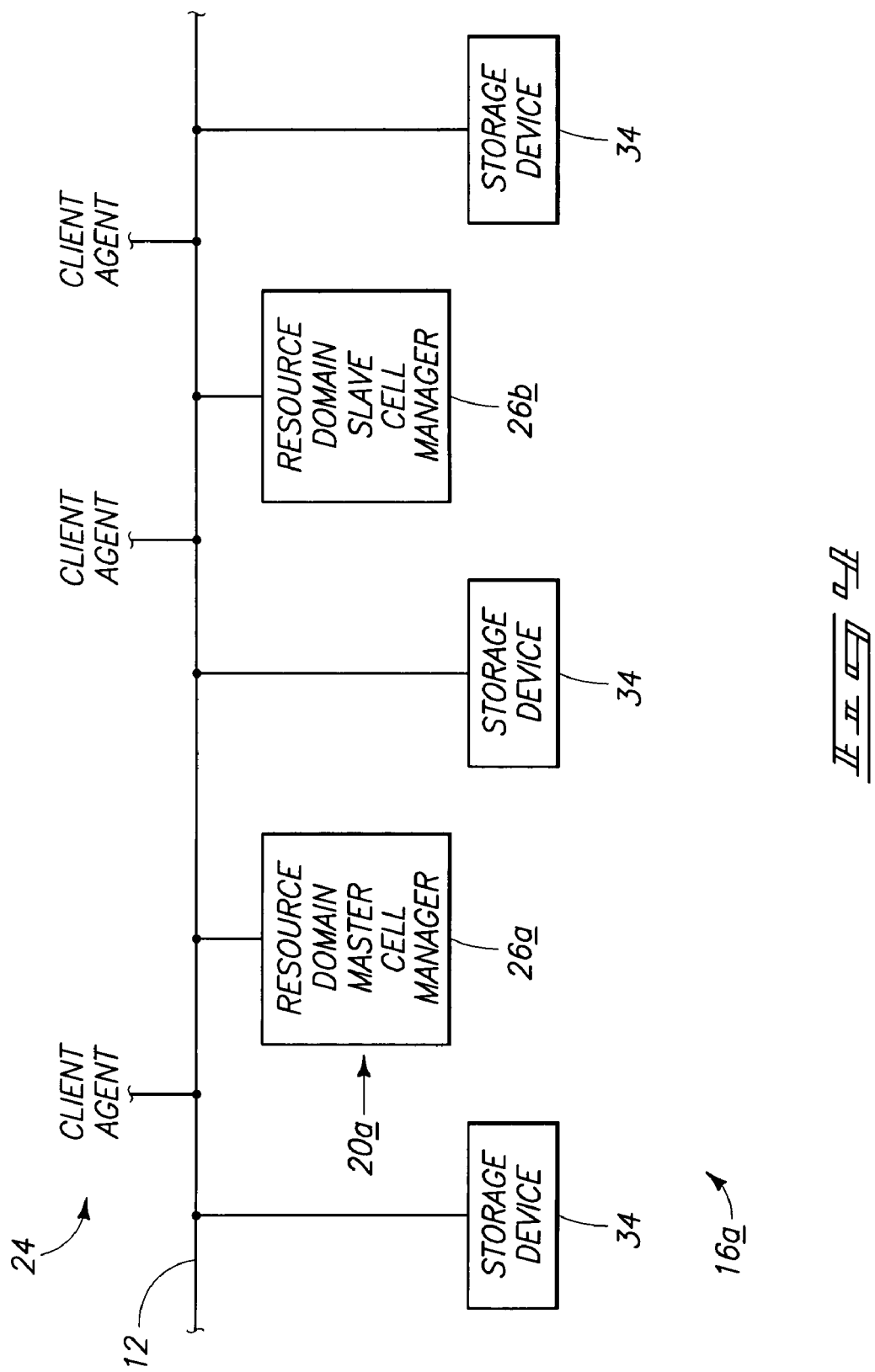
FIG. 4 is a functional block diagram of an exemplary data management system according to another embodiment.

Referring to FIG. 1, a computer network 10 is shown according to one possible embodiment to depict exemplary aspects described herein. Other configurations of computer network 10 are possible, including more, less, and/or alternative components. As shown, the exemplary computer network 10 includes a network connection 12, a plurality of protected computer systems 14, and a data management system 16. Data management system 16 may be referred to as a resource domain in one embodiment.

Network connection 12 is configured to implement data transfer between coupled devices. In one arrangement, network connection 12 provides communications between protected computer systems 14 and data management system 16. Network connection 12 may also provide data communication intermediate internal devices of data management system 16 described further below in accordance with exemplary embodiments. The network connection 12 may comprise a local area network (LAN) and/or a storage area network (SAN) in possible configurations.

Protected computer systems 14 are configured to generate electronic data to be stored for subsequent retrieval and access. Exemplary protected computer systems 14 may comprise personal computers, work stations, servers, combinations of such devices, and/or other electrical devices capable of providing or accessing electronic data. In one embodiment, protected computer systems 14 comprise respective electronic file systems or groups of electronic file systems.

Data management system 16 is configured to store (protect) electronic data of protected computer systems 14. Data management system 16 may operate to perform exemplary operations, such as backup and restore, with respect to electronic data of protected computer systems 14. Other operations may be provided.

As described below with respect to FIG. 2, data management system 16 comprises resources configured to store a certain amount (e.g., bits or bytes) of electronic data. The data management system 16 accordingly has a storage capacity corresponding to the size of the storage resources. In addition, data management system 16 may have a throughput or processing capacity corresponding to available data processing resources in one embodiment. Exemplary aspects provide a scalable data management system 16 wherein the storage capacity and/or processing capacity may be increased as described in detail below.

Referring to FIG. 2, an exemplary configuration of a data management system 16 is shown. The depicted data management system 16 comprises storage control circuitry 2Q, a data storage system 22, and one or more client agent 24 coupled with network connection 12. Other arrangements of data management system 16 are possible.

In one embodiment, storage control circuitry 20 is implemented using a cell manager 26 comprising a server. An exemplary cell manager 26 comprises an interface 28, processing circuitry 30, memory 31, and a database 32.

Interface 28 is configured to display status information and receive user inputs in one arrangement. Interface 28 may be embodied as a graphical user interface (GUI) or other appropriate configuration.

Processing circuitry 30 is arranged to monitor and control operations of data management system 16. Processing circuitry 30 may be implemented using any appropriate configuration of hardware, software, and/or firmware to implement monitoring and control operations. For example, in the illustrated exemplary embodiment, processing circuitry 30 is implemented using a microprocessor. Memory 31 is configured to store processor-usable code or data for use by processing circuitry 30 in one embodiment.

Database 32 may be implemented in any appropriate medium and may be referred to as a tracking database. Database 32 is configured store configurations of the data management system 16, allocation of resources of system 16, relationship of resources to protected computer systems 14, locations of stored data within system 16, and other desired data. As described further below, database 32 stores associations of protected computer systems with respective storage devices in one arrangement.

The illustrated exemplary configuration of data management system 16 additionally includes a plurality of storage devices 34. Individual storage devices 34 comprise an archive agent 36 and a physical storage space 38 in but one arrangement.

Archive agents 36 access data from appropriate client agents 24 and control storage of the data within the respective physical storage spaces 38. Archive agents 36 control reading and writing operations with respect to the respective physical storage spaces 38.

Archive agents 36 include respective processing circuits 37 configured to control operations of the respective data storage devices 34. Processing circuitry 37 may be implemented using any appropriate configuration of hardware, software, and/or firmware (e.g., microprocessor and appropriate programming in the illustrated example) to implement monitoring and control operations. Memory 39 of the individual archive agents 36 are configured to store processor-usable code usable by the respective processing circuits 37. Archive agents 36 may comprise servers in one embodiment.

Archive agents 36 may perform maintenance operations with respect to the data stored using the respective storage spaces 38. For example, in one embodiment, a baseline or a base version of a data object (e.g., word processing document, email, etc.) is stored using one of the physical storage spaces 38. A change to the data object provides a delta version which includes the respective changes to the baseline. Archive agents 36 may perform re-baseline maintenance operations wherein delta changes are applied to original baselines of the data object, resulting in new baselines of the data objects at the moment of re-baselinings. In addition, the delta(s) may be combined during restoration operations to provide restored versions of the baselines. For example, the archive agents 36 communicate compressed data comprising the baselines and the deltas to the client agents 14 for the restoration wherein the delta(s) are applied to the respective baselines. Further, archive agents 36 may implement interleaving operations to communicate compressed data to respective client agents 24.

Physical storage spaces 38 may be implemented using any appropriate storage medium. Hard disk storage media may be utilized in at least one embodiment, although other storage media are possible. Data storage system 22 comprises one or more of the physical storage space 38 in one illustrative arrangement. Data storage system 22 is configured to store data of a plurality of client protect computer systems 14. Accordingly, one embodiment provides a resource domain wherein a plurality of storage devices 34 are aggregated together and associated with one (or more) cell manager 26.

During configuration of data management system 16, client agents 24 are associated with respective ones of protected computer systems 14. Client agents 24 may comprise programming (e.g., software) modules installed upon the respective protected computer systems 14. Other arrangements are possible.

In one embodiment, client agents 24 are configured to provide data from the respective protected computer systems 14 to the storage devices 34 for storage. Client agents 24 operate to extract data from the respective protected computer system 14, to compress the data (if desired), and to forward the data to be protected to a respective archive agent 36 for storage. Data communicated from a plurality of client agents 24 to one or more storage devices 34 may be interleaved (e.g., a large number of systems 14 are sending delta versions) wherein compressed data from a plurality of systems 14 is communicated to storage device(s) 34 in a single sequential data transfer. During a restore, the archive agent 34 may resend the baseline and delta versions (potentially interleaved) to the respective client agents 14 in an appropriate order for the restore.

As described above, extracted and forwarded data may comprise original versions of data objects (baselines), and updated versions of the objects (deltas). Client agents 24 also operate to decompress received data from storage devices 34 and to provide the data as live data for usage within the respective protected computer systems 14.

As mentioned above, protected computer systems 14 are associated with respective storage devices 34. In one embodiment, the storage devices 34 individually perform data protection operations for an entirety of the data of the respective protected computer system 14. In another embodiment, a plurality of storage devices 34 may be utilized to provide data protection operations for a single protected computer system 14 (e.g., wherein system 14 comprises a relatively substantial amount of data to be protected). Accordingly, in at least one embodiment, cell manager 26 may distribute protection of a relatively large protected computer system 14 (e.g., file server, database) across the resource domain using a smaller granularity of information objects. For example, one file system of the protected computer system 14 may be protected using a first storage device 34 and another file system of system 14 may be protected using a second storage device 34. In another example, different volumes of a system 14 comprising a file server or different tables of a system 14 comprising a database may be protected using respective different storage devices 34. In addition, an individual storage device 34 may store data for a plurality of protected computer systems 14.

Cell manager 26 may maintain a map of a distribution of the protected computer system 14 across the storage devices 34 using database 32. The client agent 24 of the respective system 14 having the distributed data protection over a plurality of storage devices 34 is configured to handle multiple concurrent backup/restore streams to the plurality of storage devices 34 in one configuration.

In one embodiment, it is desired to store all delta versions of a given baseline data object on the same storage device 34 which stores the baseline version. Such facilitates maintenance operations including, for example, re-baselining using the respective archive agent 36 of the storage device 34 or restoration using respective client agents 24. In addition, provision of the delta and baseline versions on the same storage device 34 minimizes degradation of LAN/SAN performance during maintenance processes (e.g., re-baselining) by providing data transfers within the respective storage device 34.

During data protection operations, resources of the data management system 16 are consumed. Consumed resources may include processing capacity for processing operations with respect to protection of data and storage capacity to physically store digital data. Over time, the amount of data for one or more system 14 to be physically stored typically increases. It may be possible to increase a capacity of physical storage space 38 (e.g., add additional disks) to accommodate the increased amount of data. However, some storage device configurations have maximum capacities wherein data may be properly protected. At some threshold, limitations may be imposed by an inability to add additional physical storage space 38, an inability to process input/output requests or other processing in a timely manner within respective processing circuits 37 of the devices 34 and/or other limitations.

According to at least one embodiment, data management system 16 comprises a scalable system configured to provide storage of data in arrangements wherein a quantity of data of the protected computer systems 14 exceeds storage capacities of individual storage devices 34. Data management system 16 is flexible and is configured to facilitate increases in storage capacity and/or processing capacity according to the amount of data to be protected. Accordingly, at least some embodiments described herein provide scalable storage capacity and/or processing capacity corresponding to the data protection requirements of protected computer systems 14.

In one embodiment, storage control circuitry 20 comprising cell manager 26 is configured to implement and to control scaling operations. As described above, the illustrated data management system 16 comprises a plurality of storage devices 34. In one aspect, storage control circuitry 20 is configured to associate respective ones of the protected computer systems 14 with respective resources of data management system 16. In one exemplary implementation, storage control circuitry 20 is configured to assign individual storage devices 34 to store data for respective ones of protected computer systems 14.

For example, in one embodiment, existing client agents 24 (and protected computer systems 14) are associated with respective storage devices 34 upon initial configuration of data management system 16. A user may access interface 28 of cell manager 26 to associate the protected computer systems 14 with respective storage devices 34. In another embodiment, cell manager 26 may access information regarding protected computer systems 14 to be protected as well as storage devices 34 (e.g., information regarding capacities of the storage devices 34). Cell manager 26 may associate protected computer systems 14 with storage devices 34 responsive to the capacity information to achieve load balancing within data management system 16. Additional exemplary details regarding load balancing are described below. Following association, storage devices 34 store data for the respective protected computer systems 14 associated therewith.

Cell manager 26 is configured to store the configuration of associated client agents 24 and protected computer systems 14 in tracking database 32. During storage operations, cell manager 26 maintains records in tracking database 32 identifying objects and storage locations of objects stored in the respective storage devices 34, including baselines and delta versions.

At moments in time after the original configuration of data management system 16, it may be desirable to modify the configuration. For example, if a new protected computer system 14 is to be added, a user may access cell manager 26 informing storage control circuitry 20 of the new system 14. Storage control circuitry 20 may perform reconfiguration operations to protect the new system 14. Further details of the reconfiguration are described below.

Referring to FIG. 3, an exemplary reconfiguration operation is disclosed for adding a new protected computer system 14 for protection by data management system 16. The depicted method is executed using processing circuitry 30 of storage control circuitry 20 in one embodiment. Other methods are possible including more, less or alternative steps.

At a step S10, processing circuitry 30 receives a client request to add a new protected computer system 14. A user may input the request via interface 28 in one example.

At a step S12, processing circuitry 30 processes the request and monitors capacities of the respective storage devices 34 in an effort to determine an appropriate storage device 34 to accommodate the new system 14. In one embodiment, processing circuitry 30 communicates with respective archive agents 36 regarding available capacities of the respective storage devices 34. Archive agents 36 may provide information regarding storage capacity available within respective physical storage spaces 38. Archive agents 36 may provide information regarding processing capacity of the respective processing circuits 37 with respect to input/output requests, maintenance operations, etc.

At a step S14, processing circuitry 30 operates to identify and assign an appropriate storage device 34 to protect data of the protected computer system 14 to be added responsive to the monitored information determined in step S12. In one embodiment, the processing circuitry 30 identifies an appropriate storage device 34 in an effort to provide load balancing wherein data protection loads are relatively evenly spread or divided amongst the storage devices 34 (e.g., processing circuitry 30 identifies and assigns the storage device 34 having the greatest available capacity). Available capacity may be represented as storage, processing, or a combination of both capacities.

Accordingly, load balancing is implemented in at least one embodiment during association of storage devices 34 with respective protected computer systems 14. Loads are preferably balanced to effectively maximize utilization of resources of system 16. One aspect of load balancing is to balance data throughput to avoid overloading a storage device 34 with an excessive number of backup or restore operations at the same time. One exemplary load balancing solution is to limit a number of concurrent backup jobs for a given storage device 34 created by a policy manager. In one arrangement, policy manager aspects are implemented using processing circuitry 30 and configured to control data management processes (e.g., backup to disk archive, backup to tape, etc.). The process may be based upon a Service-Level Objective (SLO) which may be specified by a user. The processes may specify in some examples that all data is to be protected within a specified time period. The restore time could be used to determine whether data copies are held on disk archive (with tape used as tertiary storage) for fast restore times, or whether the data copies are held on tape in one example. The policy manager may create, monitor and modify the data management processes based on the Service-Level Objective or other specification, and this may include the configuration of any backups to disk archive.

In one exemplary aspect, the cell manager 26 may determine the number of backup jobs to be executed in accordance with Service-Level Objective policies defined by a user or administrator. Cell manager 26 may distribute start times for the desired backup jobs to ensure that a maximum number of concurrent backup jobs running for respective archive agents 36 does not exceed maximum capabilities of the respective archive agents 36. In addition, a portion of processing resources of a given archive agent 36 may not be assigned for backup jobs, but remain free for availability for restore jobs which may be initiated by an administrator.

In one arrangement, individual archive agents 36 are configured to report a respective maximum concurrent backup job capability to a policy manager to provide the policy manager with information regarding the number of backup jobs to allow at any one time. In one embodiment, if an archive agent 36 has a fixed hardware capability, then the maximum concurrent backup/restore job limit may be set as a constant by the archive agent 36. In another embodiment, an archive agent 36 may have varying performance characteristics (e.g., agent 36 embodied in a server implementation), and the archive agent 36 may evaluate the environment by running performance throughput tests and calculating a maximum concurrent backup/restore job limit therefrom. In server implementations, it is desired to implement software of an archive agent 36 using a dedicated server to avoid inaccuracies with respect to available throughput which may be consumed by other non-dedicated services.

In one arrangement, the policy manager estimates the length of time each backup job is run to provide start times for subsequent backup jobs to be performed after completion of the previous jobs. The scheme may be adaptive to defer or otherwise modify the start time of a subsequent job if a previous job has not yet been completed, or perform other modifications.

In some implementations, it may not be possible for a policy manager to align start times of backup jobs to meet performance limits and SLO objectives. For example, if there are 100 backup jobs for a single archive agent 36, and the jobs require an hour to run, and an SLO runs every hour, then the policy manager proceeds to run 100 backup jobs concurrently even if the archive agent can only process 50 jobs before performance problems occur. In this situation, the policy manager may send an error message to an administrator informing them that the SLO which has been defined will result in performance problems with archive jobs and the administrator may reduce SLO requirements, add additional storage devices 34, or perform other remedial action. The described method is exemplary for illustrative purposes. Other load balancing methods may be used.

At a step S16, processing circuitry 30 instructs the new client agent 24 of the identification of the appropriate storage device 34 to use for storage. Client agent 24 directs data to be stored and requests to the identified storage device 34. In one embodiment, the identified storage device 34 processes requests and stores data for the newly added protected computer system 14 unless subsequent reconfiguration occurs.

At a step S18, processing circuitry 30 monitors and tracks storage activity of the protected computer systems 14 (including the newly added system 14) with respect to the storage devices 34 of the data management system 16 including monitoring of the baseline and delta versions stored within the respective storage devices 34.

Referring to FIG. 4, another exemplary arrangement of data management system is depicted with respect to reference character 16a. As mentioned previously, some embodiments provide scalability of storage devices 34 to accommodate new and/or growing protected computer systems 14. The embodiment of FIG. 4 provides scalable storage control circuitry 20a comprising a plurality of cell managers 26a, 26b. In the exemplary embodiment of FIG. 4, backup settings may be distributed across the resource domain and interlocks may be created.

In one arrangement, storage control circuitry 20a is arranged as a distributed control system. For example, storage control circuitry 20a may be arranged in a master/slave relationship wherein cell manager 26a may be referred to as a resource domain master cell manager and cell manager 26b may be referred to as a resource domain slave cell manager. Additional slave cell managers 26b may be provided.

Master cell manager 26a is responsible for monitoring operations as described above with respect to the cell manager 26. Master cell manager 26a monitors capacities of storage devices 34 and slave cell managers 26b in an effort to implement load balancing during configuration operations. For example, master cell manager 26a may poll slave cell managers 26b with respect to capacities of the slave cell managers 26b or the storage devices 34 associated therewith. Protected SLO policy settings may be set within the master cell manager 26a and distributed to slave cell managers 26b (e.g., providing setting of policies for protected computer systems 14 by the master cell manager 26a).

Slave cell managers 26b manage respective storage devices 34 in one embodiment. For example, the slave cell managers 26b may maintain respective tracking databases for the associated storage devices 34. In addition, slave cell managers 26b may provide requested information to master cell manager 26a. For example, slave cell masters 26b may provide capacity (e.g., processing and/or storage) information to master cell master 26a upon request.

Master cell manager 26a implements configuration operations according to one embodiment. During initial configuration, master cell manager 26a may assign client agents 24 to slave cell managers 26b and respective storage devices 34. Subsequent reconfiguration operations may be implemented at appropriate times, for example, to add a new protected computer system 14. In one embodiment, a user may access an interface of a master or slave cell manager 26a, 26b to request entry of a new system 14 for protection using data management system 16. The requests may be forwarded to master cell manager 26a if not already provided thereto. Master cell manager 26a analyzes the capacities and/or resources of the respective slave cell managers 26b and storage devices 34 during reconfiguration operations. In one embodiment, master cell manager 26a selects an appropriate storage device 34 and the respective slave cell manager 26b to protect the data of the newly added protected computer system 14 in an effort to implement load balancing. The client agent 24 for the added system 14 is instructed to utilize the selected slave cell manager 26b and storage device 34 for data protection services. Thereafter, the slave cell manager 26b and respective storage device 34 implement the data protection operations with respect to the newly added protected computer system 14.

The arrangement of FIG. 4 may be configured to utilize the resources of a plurality of slave cell managers 26b for a single protected computer system 14. For example, a single protected computer system 14 may be distributed across multiple storage devices 34 or multiple slave cell managers 26b if the amount of data to be protected for a single system 14 exceeds limits of a single cell manager 26 (e.g., exceeds tracking database limitations). If the data of a single system 14 is distributed amongst a plurality of slave cell managers 26b, the master cell manager 26a may track how the portions of the data are distributed in an internal tracking database and display the distribution for a user via interface 28.

Additional aspects provide migration of data intermediate a plurality of storage devices 34 of data management system 16. For example, according to embodiment, if one of the storage devices 34 runs out or is about to run out of resources (e.g., due to an amount of disk archive data being stored, or the amount of backup/restore data being processed), maintenance processes of data management system 16 may provide transfer of data from one storage device 34 to another storage device 34 having spare resources. Migration may be initiated responsive to a processing or storage capacity threshold being reached. Other criteria may trigger migration in other embodiments. Cell manager 26 may perform processing operations (e.g., monitoring described above) to select an appropriate target storage device 34.

In one arrangement, the transfer of data is transparent to the protected computer system 14, and the system 14 continues according to its data protection policy during a period of transfer. Following successful transfer of the data, subsequent protected computer backups are performed by the target or receiving storage device 34 and the source or original storage device 34 deletes disk archive data including baselines and deltas of the objects from the protected computer systems 14 that were moved. Accordingly, the resources used by those systems may be found in the source storage device 34. The tracking database 32 of the appropriate cell manager 26 may be updated responsive to the migration.

Migration or transfer operations are implemented over a LAN between the target and source archive agents 36 in one embodiment. According to another arrangement, transfer of archive data may be performed using Storage Area Network (SAN) data movers if storage space 34 of the target and source storage devices 34 are on the same SAN and the data was not interleaved. For configurations wherein storage space 34 is implemented using a dedicated volume on a dedicated disk array of Logical Unit Numbers (LUNs) to store archive data, second level archive data may be transferred to a target storage device 34 by remapping LUNs rather than moving data over a SAN. Other arrangements are possible for migrating data between source and target storage devices 34.

As described herein, at least one embodiment enables a plurality of storage devices, or subsystems, to be used as a common scalable pool of resources. One or more cell manager may act as a resource domain and have access to multiple storage devices. In one embodiment, automatic load balancing of archive data for all protected computer systems 14 is provided according to variable design criteria yielding optimum use of resources. Automatic migration of archive data for an entire protected computer system 14 (or entire volumes, file systems, etc. for large systems) according to at least some aspects provides optimum usage of resources of data management system 16 in an implementation wherein the migration is transparent to a user. In addition, as more protected computer systems 14 are added for protection by data management system 16, additional storage devices 34 and cell managers 26 may be added with minimal or no manual reconfiguration of the system.

At least some embodiments or aspects described herein may be implemented using processor-usable code or executable code stored within appropriate storage devices, or communicated via a network or using other transmission media, and configured to control appropriate processing circuitry. For example, processor-usable code may be provided via articles of manufacture, such as an appropriate processor-usable medium, or alternately embodied within a data signal (e.g., carrier wave, data packets, etc.) communicated via appropriate media, such as a communication network (e.g., the Internet and/or a private network) or other communication structure. Processor-usable media may include any media which can contain, store, or maintain programming for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette such as a floppy diskette, or zip disk, hard drive, random access memory, read only memory, flash memory, erasable programmable read only memory, optical disk, or other configurations capable of storing programming, data, or other digital information.

The protection sought is not to be limited to the disclosed embodiments, which are given by way of example only, but instead is to be limited only by the scope of the appended claims.

What is claimed is:

1. A data management system comprising:
a data storage system configured to store data of a plurality of protected computer systems, wherein the data storage system comprises a plurality of storage devices individually having a respective capacity, and a quantity of the data of the protected computer systems to be stored exceeds capacities of individual ones of the storage devices; and
storage control circuitry coupled with the data storage system and configured to assign individual ones of the individual storage devices to store data for respective ones of the protected computer systems.

2. The system of claim 1 wherein the storage control circuitry is configured to receive a request to add a new protected computer system and to assign only one of the storage devices to implement data storage operations with respect to the new protected computer system as a result of the request.

3. The system of claim 2 wherein the storage control circuitry is configured to monitor a status of the one storage device and to assign the one storage device for the new protected computer system using the monitoring.

4. The system of claim 3 wherein the monitoring comprises monitoring a processing capacity of an archive agent of the one storage device.

5. The system of claim 3 wherein the monitoring comprises monitoring a storage capacity of physical storage space of the one storage device.

6. The system of claim 3 wherein the monitoring comprises monitoring a status of a plurality of the storage devices, and the assigning comprises assigning the one storage device which has a greatest available capacity using the monitoring.

7. The system of claim 1 wherein entireties of the data for the protected computer systems are stored using respective assigned ones of the storage devices.

8. The system of claim 1 wherein the storage control circuitry is configured to assign a plurality of the storage devices to store an entirety of the data for one of the protected computer systems.

9. The system of claim 1 wherein the storage control circuitry comprises a tracking database configured to store associations of the storage devices with respective ones of the protected computer systems.

10. The system of claim 1 wherein at least one of the storage devices is configured to store data for a plurality of the protected computer systems.

11. The system of claim 1 wherein the storage control circuitry comprises a master cell manager and at least one slave cell manager, and wherein the master cell manager is configured to assign one of the protected computer systems to one of the storage devices associated with the at least one slave cell manager.

12. The system of claim 1 wherein the protected computer systems are external of the data management system.

13. The system of claim 1 wherein the protected computer systems are associated with respective different entities and the protected computer systems are independent and not associated with one another.

14. The system of claim 1 wherein the plurality of storage devices individually comprise processing circuitry and a physical storage space, and the processing circuitry of the storage devices are configured to control storage operations or respective ones of the physical storage spaces.

15. The system of claim 14 wherein the storage devices are associated with one another and the storage control circuitry is configured to implement data storage operations with respect to individual ones of the storage devices.

16. A data management system comprising:
   plural means for storing electronic data, wherein individual ones of the plural means for storing comprise a respective data storage capacity;
   means for communicating data intermediate the plural means for storing and a plurality of protected computer systems, wherein a quantity of data of the protected computer systems exceeds individual data storage capacities of individual ones of the means for storing; and
   means for assigning individual ones of the means for storing to store data for respective ones of the protected computer systems.

17. The system of claim 16 wherein the plural means for storing individually comprise means for storing an entirety of the data for a respective one of the protected computer systems.

18. The system of claim 16 wherein plural ones of the means for storing comprise means for storing an entirety of the data for a respective one of the protected computer systems.

19. The system of claim 16 further comprising tracking means for storing information regarding associations of individual ones of the plural means for storing with respective ones of the protected computer systems.

20. The system of claim 16 wherein the plural means for storing individually comprise archive means and physical storage means.

21. An article of manufacture comprising:
   a processor-usable medium configured to store processor-usable code configured to cause processing circuitry of storage control circuitry to:
      access information regarding a plurality of storage devices;
      access information regarding a plurality of protected computer systems;
      associate individual ones of the protected computer systems with respective ones of the storage devices;
      receive a request to add a new protected computer system;
      monitor capacities of the storage devices; and
      assign the new protected computer system to one of the storage devices using the monitoring.

22. The article of claim 21 wherein the processor-usable code is configured to cause the processing circuitry to perform the association as a result of user input.

23. The article of claim 21 wherein the processor-usable code is configured to cause the processing circuitry to perform the association using the monitoring.

24. The article of claim 21 wherein the storage control circuitry and the plurality of storage devices are components of a data management system which is configured to store data of the protected computer systems, and wherein the protected computer systems are external of the data management system and the storage devices.

25. A data management system operational storage method comprising:
   providing a plurality of storage devices of a data management system configured to store data for a plurality of protected computer systems, wherein the storage devices individually comprise processing circuitry and a storage space;
   monitoring capacities of individual ones of the storage devices;
   associating one of the protected computer systems with one of the storage devices using the monitoring; and
   implementing storage operations of the data for the associated one of the protected computer systems using the associated one of the storage devices in accordance with the associating.

26. The method of claim 25 wherein a quantity of data of the protected computer systems to be stored exceeds individual capacities of individual ones of the storage devices.

27. The method of claim 25 further comprising maintaining a record of the association of the one storage device and the one protected computer system.

28. The method of claim 25 wherein the monitoring comprises monitoring storage capacities of the storage devices.

29. The method of claim 25 wherein the monitoring comprises monitoring processing capacities of the storage devices.

30. The method of claim 25 wherein the monitoring and assigning comprise monitoring and assigning using storage control circuitry.

31. The method of claim 30 further comprising providing the storage control circuitry comprising a distributed control system.

32. The method of claim 25 wherein the associating comprises associating the one protected computer system with the one storage device having a greatest available capacity.

33. The method of claim 25 further comprising transferring at least a portion of the data of the one protected computer system from the one storage device to an other storage device.

34. The method of claim 25 wherein the providing the plurality of storage devices comprises providing the storage devices of a data management system external of the protected computer systems, and further comprising:
   storing data using storage circuitry of the protected computer systems; and storing the data of the protected computer systems using respective ones of the storage devices associated with the protected computer systems.

35. The method of claim 25 wherein the monitoring, the associating, and the implementing comprise acts performed by processing circuitry of the data management system.

36. The method of claim 25 wherein the implementing storage operations comprises storing the data for the associated one of the protected computer systems using the associated one of the storage devices.

37. A data management system operational storage method comprising:
provide a plurality of storage devices of a data management system configured to store data for a plurality of protected computer systems, wherein the storage devices individually comprise processing circuitry and wherein the storage devices are external of the protected computer systems;
storing the data using the storage devices;
monitoring capacities of the storage devices using storage control circuitry;
providing a new storage device configured to store data for at least one of the protected computer systems; and
coupling processing circuitry of the new storage device with the storage control circuitry.

38. The method of claim 37 further comprising monitoring capacity of the new storage device using the storage control circuitry after the coupling.

39. The method of claim 37 wherein the monitoring comprises monitoring processing capacities of the storage devices.

40. The method of claim 37 wherein the monitoring comprises monitoring storage capacities of the storage devices.

41. The method of claim 37 wherein the monitoring comprises monitoring using processing circuitry of the data management system.

42. The method of claim 37 further comprising storing the data for the protected computer systems using the storage devices of the data management system.

43. A computer network comprising:
a plurality of protected computer systems individually comprising processing circuitry configured to process data and storage circuitry configured to store the data; and
a data management system comprising:
a data storage system configured to store the data of the protected computer systems, wherein the data storage system comprises a plurality of storage devices individually having a respective capacity, and a quantity of the data of the protected computer systems to be stored by the data management system exceeds capacities of individual ones of the storage devices; and
storage control circuitry coupled with the data storage system and configured to assign individual ones of the individual storage devices to store data for respective ones of the protected computer systems.

44. The network of claim 43 wherein the storage devices individually comprise:
a physical storage space configured to store the data of a respective one of the protected computer systems; and
processing circuitry configured to control storage of the data of the respective one of the protected computer systems associated with the individual storage device in the respective physical storage space of the individual storage device.

45. The network of claim 43 wherein the storage control circuitry is configured to associate the individual storage devices with respective ones of the protected computer systems using information regarding capacities of the storage devices.

46. The network of claim 43 wherein entireties of the data of the protected computer systems are individually stored by the respective assigned ones of the individual storage devices.

47. The network of claim 43 wherein the protected computer systems are individually configured to communicate the data to the data management system via communications circuitry of the network.

* * * * *

UNITED STATES PATENT AND TRADEMARK OFFICE
CERTIFICATE OF CORRECTION

| | | |
|---|---|---|
| PATENT NO. | : 7,818,530 B2 | Page 1 of 1 |
| APPLICATION NO. | : 10/723950 | |
| DATED | : October 19, 2010 | |
| INVENTOR(S) | : Stephen Gold et al. | |

It is certified that error appears in the above-identified patent and that said Letters Patent is hereby corrected as shown below:

In column 11, line 28, in Claim 14, delete "or" and insert -- of --, therefor.

Signed and Sealed this
Fourth Day of October, 2011

David J. Kappos
*Director of the United States Patent and Trademark Office*